United States Patent
Igawa (10) Patent No.: US 6,619,691 B1
(45) Date of Patent: Sep. 16, 2003

(54) PASSENGER-SIDE AIRBAG DEVICE

(75) Inventor: Tadahiro Igawa, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/177,655

(22) Filed: Oct. 23, 1998

(51) Int. Cl.[7] .............................................. B60R 21/16
(52) U.S. Cl. ..................... 280/732; 280/728.3
(58) Field of Search ........................... 280/732, 728.3, 280/728.1, 752

(56) References Cited

U.S. PATENT DOCUMENTS

| | | |
|---|---|---|
| 5,140,799 A | 8/1992 | Satoh |
| 5,478,107 A * | 12/1995 | Yamagishi et al. ........ 280/728.3 |
| 5,478,113 A | 12/1995 | Rogers |
| 5,480,183 A * | 1/1996 | Ward et al. ............... 280/728.2 |
| 5,496,056 A | 3/1996 | Dyer |
| 5,609,363 A * | 3/1997 | Finelli ........................ 280/732 |
| 5,630,610 A * | 5/1997 | Murakami et al. ........ 280/728.2 |
| 5,636,861 A * | 6/1997 | Orsulak et al. .......... 280/732 X |
| 5,647,608 A * | 7/1997 | Damman et al. .......... 280/728.2 |
| 5,662,350 A * | 9/1997 | Bathon et al. ............. 280/728.2 |
| 5,662,351 A * | 9/1997 | Phillion et al. ............ 280/728.3 |
| 5,873,598 A * | 2/1999 | Yoshioka et al. .......... 280/732 X |

FOREIGN PATENT DOCUMENTS

| | | |
|---|---|---|
| DE | 42 20 825 | 1/1993 |
| FR | 2 154 234 | 5/1973 |
| JP | 4-100754 | 4/1992 |

* cited by examiner

Primary Examiner—Paul N. Dickson
Assistant Examiner—Toan To
(74) Attorney, Agent, or Firm—Kanesaka & Takeuchi (57) ABSTRACT

A passenger-side airbag device is formed of a container to be installed in an instrument panel in front of a passenger seat, a gas generator connected to the container, and an airbag accommodated in the container to be inflated by a gas generated by the gas generator. The airbag is connected to the container at a periphery around a gas inlet. The airbag includes a bulk portion formed by folding the airbag, and a peripheral area has a first length between a windshield side of the container and the bulk portion, and a second length between as occupant side of the container and the bulk portion. The first length is longer than the second length. The airbag can smoothly deploy toward the occupant on the passenger seat, not toward the windshield.

3 Claims, 10 Drawing Sheets

PASSENGER-SIDE AIRBAG DEVICE

FIELD OF THE INVENTION AND RELATED ART STATEMENT

The present invention relates to a passenger-side airbag device installed in an instrument panel in front of a passenger's seat of a vehicle including an automobile.

A passenger-side airbag device comprises a container installed in an instrument panel in front of a passenger's seat of a vehicle, a gas generator for inflating an airbag, an airbag accommodated in the container and having a gas inlet for receiving gas, and a lid covering the container. The gas generator is actuated to supply gas into the airbag when the vehicle comes into collision, and the airbag starts to expand. After the airbag starts expanding, the lid is pushed by the airbag and opens whereby the airbag inflates into a vehicle cabin.

The airbag has a gas inlet for receiving gas from the gas generator. The periphery of the gas inlet is connected to the container.

The airbag is folded, as described in JPA-4-100754, by first tucking a left side and a right side of the airbag therein toward the center to make the airbag a semi-folded body in which the width along the lateral direction is small, then folding the semi-folded body into a bellows-like configuration to form a bulk portion, and accommodating the bulk portion in the container.

Hereinafter, the folding manner of the airbag of JPA 4-100754 will be described with reference to FIGS. 6 through 12.

Figure 6:
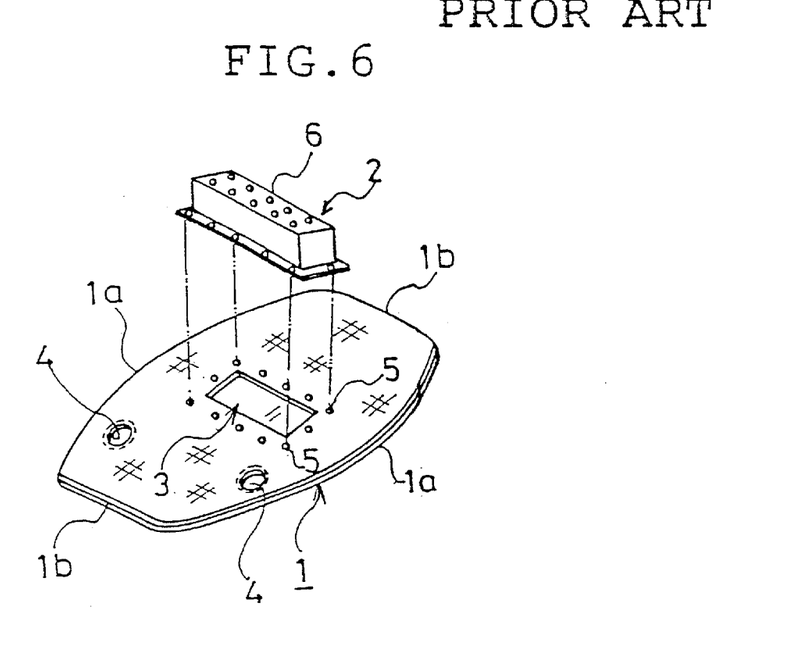
FIG. 6 is a perspective view showing a conventional example.

FIG. 6 is a perspective view of an airbag 1 in its flat-spreaded state and a sub-container 2. The airbag 1 has short sides 1b which are straight, long right and left sides 1a which are curved in an arc shape, a gas inlet 3 for receiving gas from an inflator which is formed at a center of a rear face opposite to a front face to confront an occupant, and vent holes 4 for buffering when the occupant collides with the inflated airbag. A reference numeral 5 designates a rivet hole. The sub-container 2 is provided with holes 6 formed at a bottom thereof through which gas from the inflator passes into the airbag 1.

Figure 7:
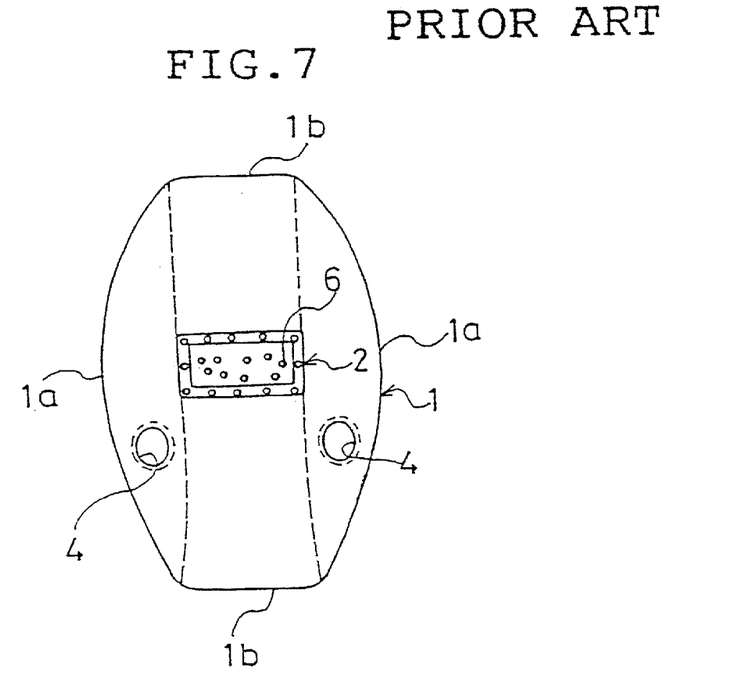
FIG. 7 is a plan view showing the conventional example.

The airbag 1 is flat spread that the sub-container 2 is connected to the airbag 1 as shown in FIG. 7. From this state, the long sides 1a are tucked in the airbag 1 in such a manner that the width of the airbag 1 becomes slightly smaller than the width of the sub-container, thereby forming a semi-folded body as shown in FIG. 8 and FIG. 9 which is a sectional view taken along a line IX—IX of FIG. 8.

Figure 8:
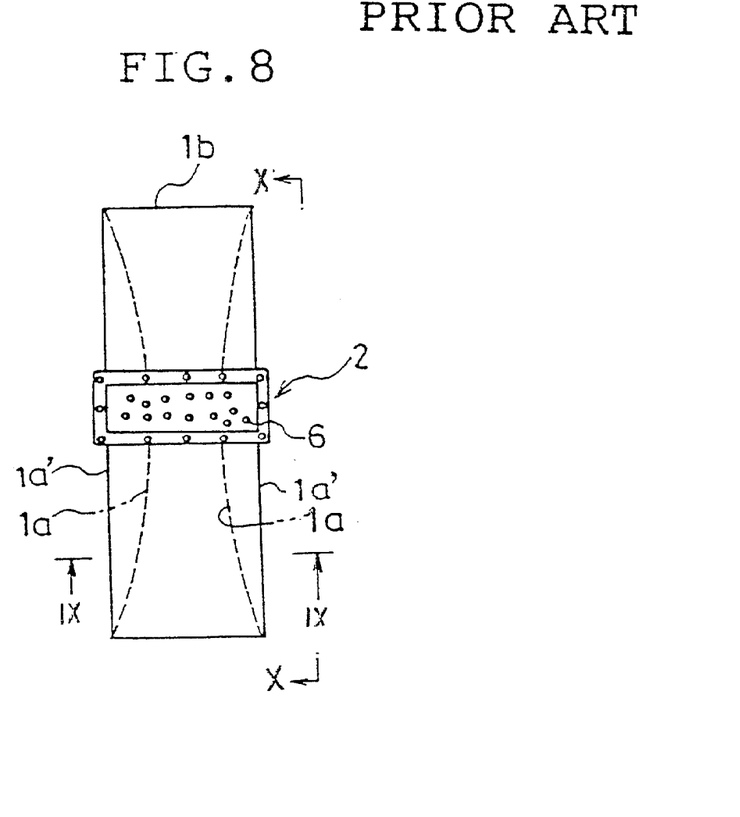
FIG. 8 is an explanatory view of a conventional airbag folding method.
Figure 9:
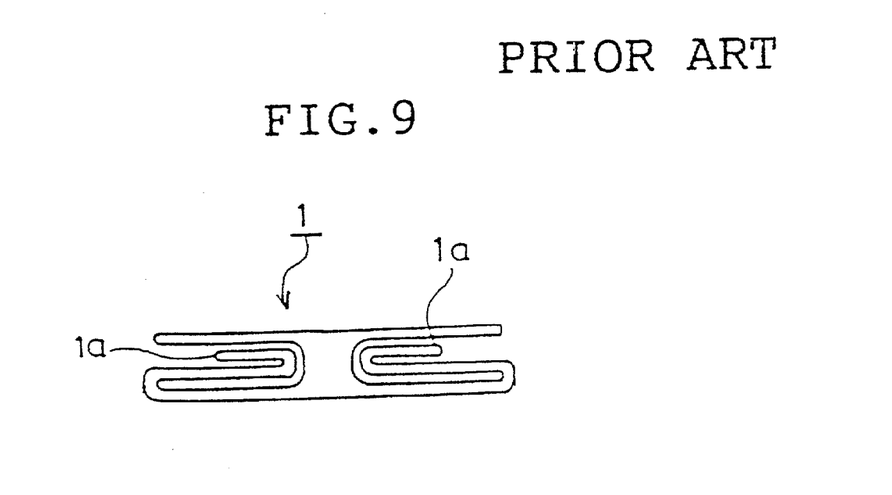
FIG. 9 is a sectional view taken along a line IX—IX of FIG. 8.
Figure 10:
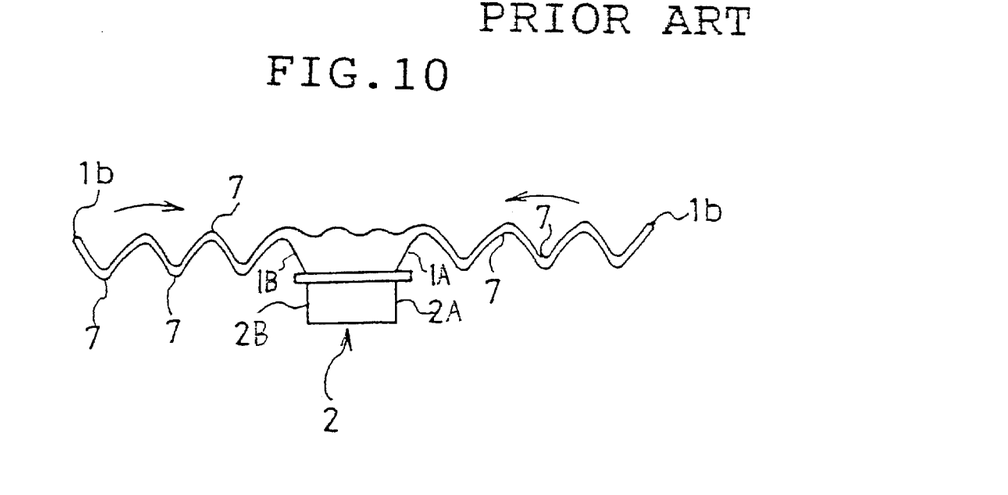
FIG. 10 is an explanatory view of the conventional airbag folding method.
Figure 11:
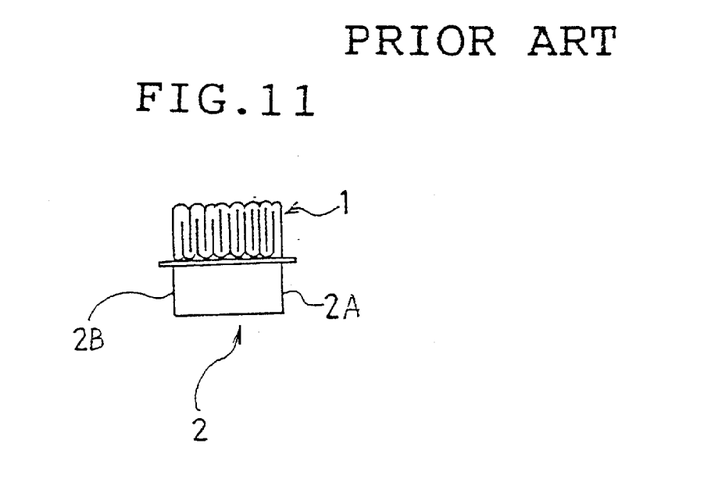
FIG. 11 is an explanatory view of the conventional airbag folding method.

Then, the semi-folded body 1 is folded many times in bellows like configuration so as to crease pleat lines 7 extending perpendicularly to straight sides 1a' of the semi-folded body as shown in FIG. 10 which is a side view taken along a line X—X of FIG. 8. As shown in FIG. 11, the folded portions are piled up and accommodated in the sub-container 2 (FIG. 12).

Though the folded airbag is accommodated in the sub-container 2 and the sub-container 2 is accommodated in a main container (not shown) in JPA 4-100754, the folded airbag is sometimes directly accommodated in the main container without the sub-container.

In the conventional passenger-side airbag device, a bulk body of the airbag is formed by folding the airbag 1. The periphery of the gas inlet 3 of the airbag 1 is connected to the sub-container 2. Among portions around the periphery of the gas inlet 3 of the airbag 1, a windshield-side portion 1A, which is connected to a windshield side 2A of the sub-container 2, has the same length as that of an occupant-side portion 1B, which is connected to an occupant side 2B of the sub-container 2.

Figure 12:
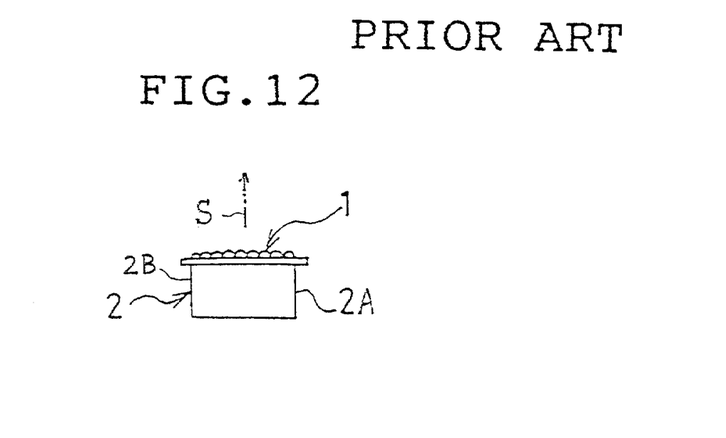
FIG. 12 is an explanatory view of the conventional airbag folding method.

Therefore, when the airbag 1 is about to be inflated (deployed) with gas from the inflator, the airbag 1 starts to expand in a direction perpendicular to the upper surface of the sub-container 2 as shown by an arrow S of FIG. 12. Since the sub-container 2 is disposed such that the upper surface thereof is parallel to a panel surface of the instrument panel, the airbag 1 starts to expand in a direction perpendicular to the panel surface of the instrument panel. In case conventional passenger-side airbag device, in which the airbag will start to expand in the direction perpendicular to the panel surface of the instrument panel, is installed in a portion of the upper surface side of the instrument panel, when the airbag collides with the windshield during its expansion so the airbag is subjected to forces such as friction from the windshield. Because of this situation, it is necessary, for inflating sufficiently the airbag, to supply high-pressure gas into the airbag to overcome the forces such as friction. Therefore, a gas generator of large capacity is required.

OBJECT AND SUMMARY OF THE INVENTION

It is an object of the invention to provide a passenger-side airbag device in which an airbag is hard to collide with a windshield during its deployment even when the airbag device is disposed in an upper-side portion of an instrument panel.

A passenger-side airbag device of the present invention comprises a container installed in an instrument panel in front of a passenger seat, a gas generator for inflating an airbag, and an airbag accommodated in the container and having a gas inlet for receiving gas. The periphery of the gas inlet is connected to the container. The airbag has a bulk portion formed by folding and a peripheral area between the bulk portion and the gas inlet. The length $L_1$ of the peripheral area between the windshield side of the container and the bulk portion is longer than the length $L_2$ of the peripheral area between the occupant side of the container and the bulk portion.

When a vehicle, in which the passenger-side airbag device is installed in the upper surface of the instrument panel, comes into collision and the gas generator is actuated, the airbag pushes outwardly the lid to open the lid and starts to expand into the vehicle cabin.

In this case, the bulk portion is moved to the upper side of the instrument panel and then the bulk portion is gradually inflated. Since the length $L_1$ of the windshield-side peripheral area is longer than the length $L_2$ of the occupant-side peripheral area, the bulk portion is moved in a direction apart from the windshield not in a direction perpendicular to the panel surface of the instrument panel. As a result, the airbag during its deployment is hard to collide (or does not collide at all) with the windshield.

It is preferable that the length $L_1$ is 1.5–4 times, particularly 1.5–3 times, more particularly 2–2.5 times longer than the length $L_2$.

According to the present invention, the airbag is preferably folded by first tucking a left side and a right side of the airbag therein toward the center to make the airbag a semi-folded body having a smaller width along the lateral direction, and then concavely folding a portion, to be confronting an occupant in the passenger seat, of the semi-folded body.

It should be understood that the right and left of the airbag means the right and left from the view point of the occupant when the passenger-side airbag device is installed in the vehicle and the occupant is oriented toward the front of the vehicle.

PREFERRED EMBODIMENTS

Figure 1:
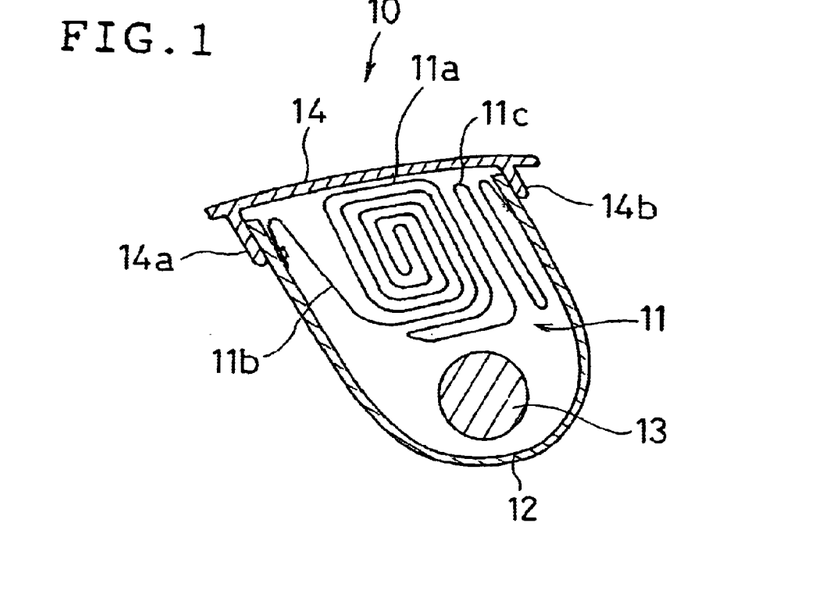
FIG. 1 is a vertical sectional view of a passenger-side airbag device according to an embodiment.
Figure 2:
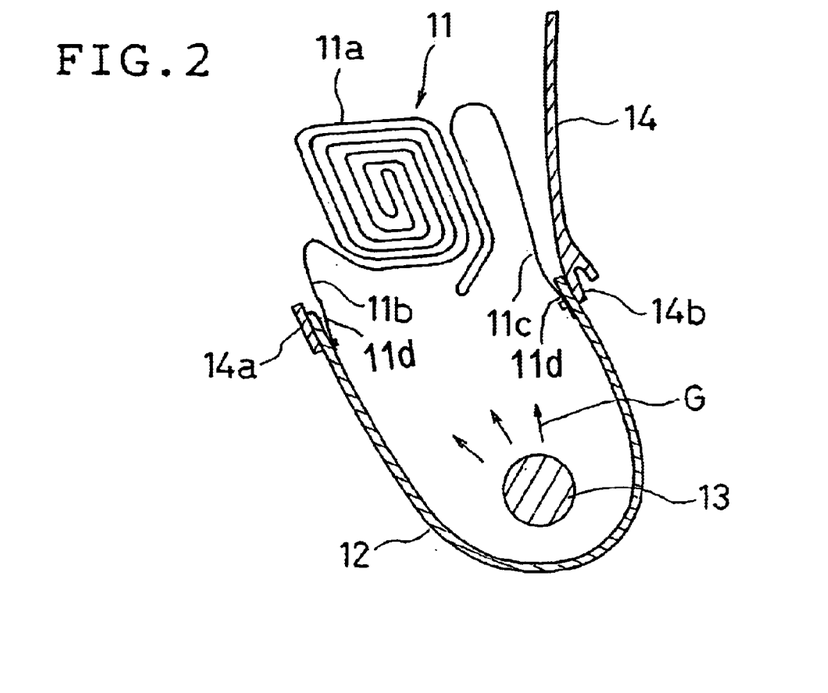
FIG. 2 is a vertical sectional view of the passenger-side airbag device according to the embodiment in the process of the expansion of an airbag thereof.
Figure 3:
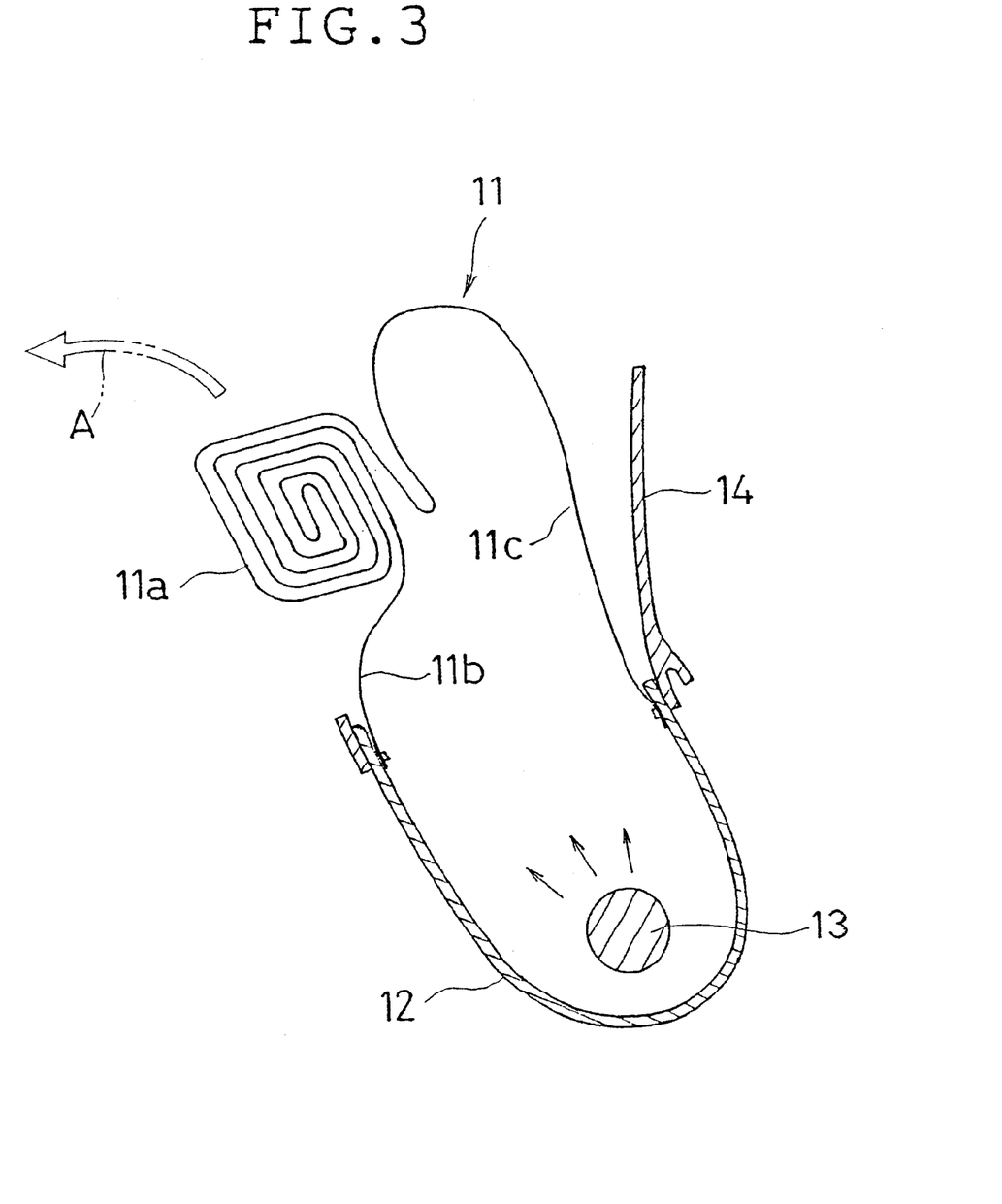
FIG. 3 is a vertical sectional view of the passenger-side airbag device according to the embodiment in the process of the expansion of the airbag.
Figure 4:
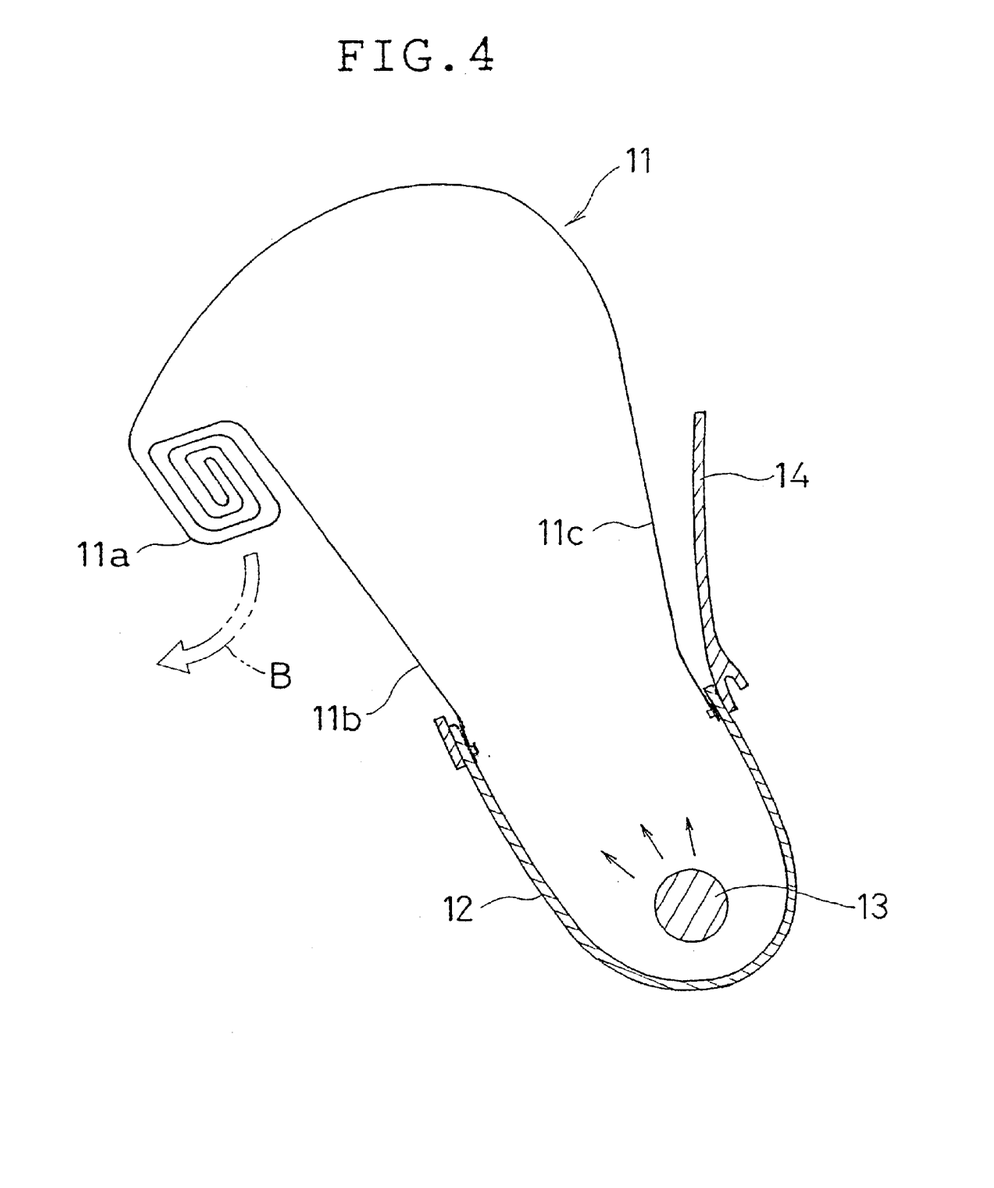
FIG. 4 is a vertical sectional view of the passenger-side airbag device according to the embodiment in the process of the expansion of the airbag.
Figure 5:
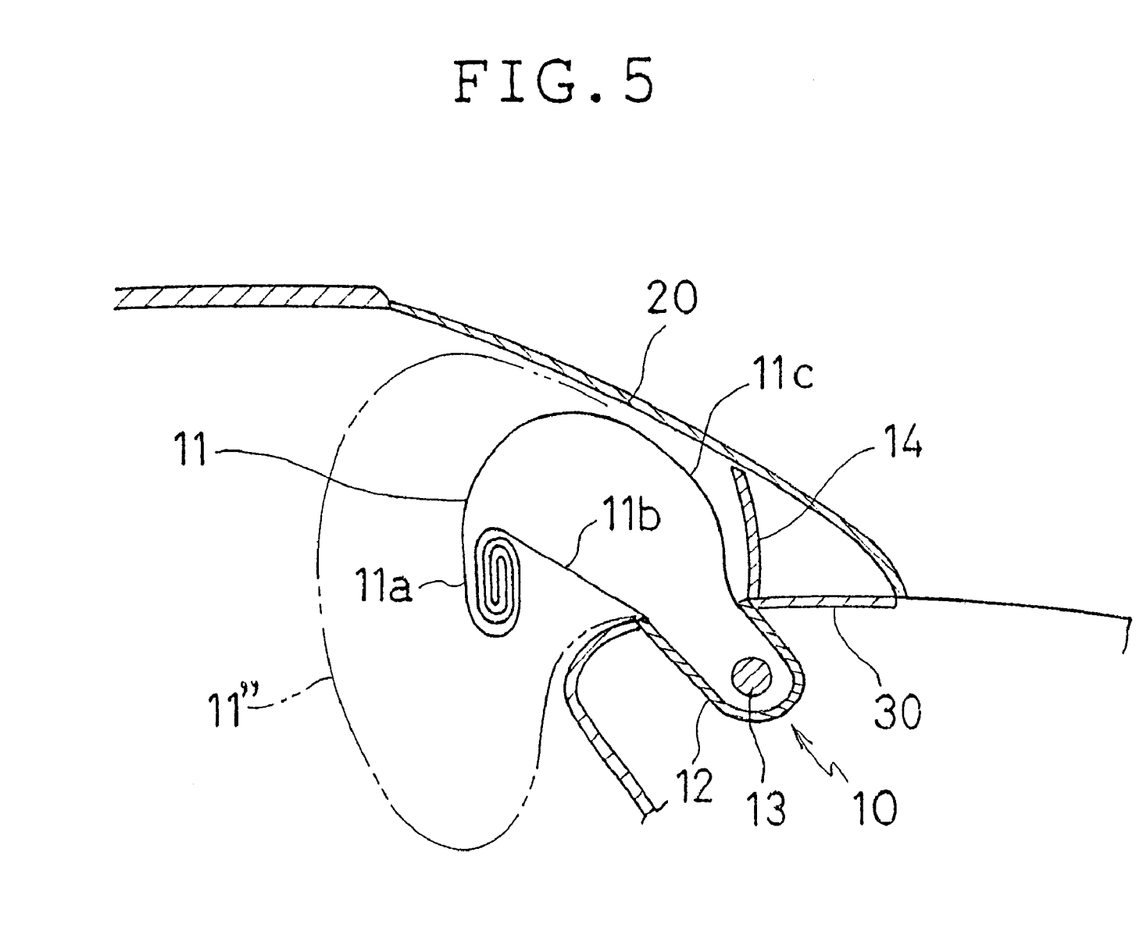
FIG. 5 is a longitudinal sectional view of a vehicle in which the passenger-side airbag device according to the embodiment is installed.
Figure 13:
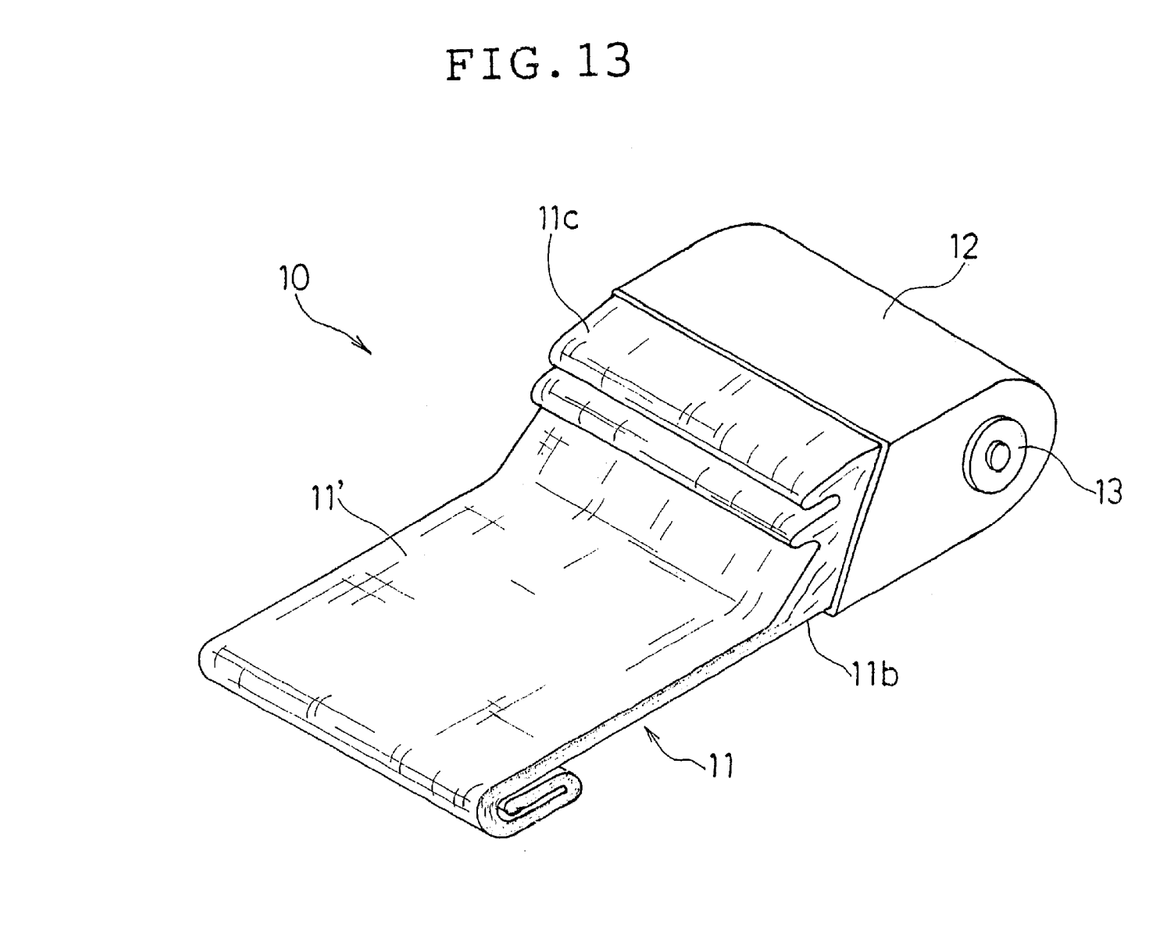
FIG. 13 is an explanatory view showing an airbag folding method of the present invention.

Hereinafter, embodiments of the present invention will be described with reference to attached drawings. FIG. 1 is a vertical sectional view (taken along the longitudinal direction of a vehicle) of a passenger-side airbag device according to an embodiment, FIG. 2, FIG. 3, and FIG. 4 are sectional views of the passenger-side airbag device in the process of the expansion of an airbag thereof, and FIG. 5 is a longitudinal sectional view of the vehicle, in which the passenger-side airbag device is installed, in the process of expansion of the airbag. FIG. 13 is a perspective view of the airbag in the process of the folding.

The passenger-side airbag device 10 comprises an airbag 11, a container 12 accommodating the airbag 11, an inflator 13 for generating gas for inflating the airbag 11, and a lid 14 covering an upper opening of the container 12.

The airbag is folded, in the same manner as described with regard to FIGS. 6 through 12, by first tucking left and right sides, i.e. longer sides, of the airbag therein toward the center to make the airbag a semi-folded body 11' which has a longer side along the longitudinal direction of the vehicle, then folding the semi-folded body 11' into the configuration as shown in FIG. 13 to form a bulk portion 11a, and accommodating the bulk portion 11a in the container 12.

In folding the airbag to form the bulk portion 11a from the semi-folded body 11', an occupant-confronting portion of the airbag is folded concavely (i.e. folded back toward the occupant-confronting surface). In this embodiment, as apparent from FIG. 1 and FIG. 13, the sub-folded body 11' is folded in a roll.

The airbag 11 is folded after the periphery of the gas inlet thereof is connected to the container 12. Among the peripheral portions surrounding the gas inlet of the airbag 11, a windshield-side peripheral portion 11c is longer than an occupant-side peripheral portion 11b. That is, the windshield-side peripheral portion 11c is folded several times between the bulk portion 11a and a windshield-side edge of the container 12, while the occupant-side peripheral portion 11b is disposed between an occupant-side edge of the container 12 and the bulk portion 11a without any folded portion or slack.

The lid 14 has legs 14a, 14b on occupant-side and windshield-side portions, respectively. The legs 14a, 14b are fixed to the container 12. The leg 14a has a fragile root so that the root of the leg 14a is broken when the inflator 13 is actuated to generate gas. As a result of this, the lid 14 opens to stand up toward the windshield 20 as shown in FIG. 5.

The airbag device 10 is installed in the vehicle so that the lid 14 is flush with an instrument panel 30.

In the passenger-side airbag device 10 as structured above, once the vehicle comes into collision, the inflator 13 is actuated to generate gas. The gas inflates the airbag 11 which in turn pushes the lid 14 so that the lid 14 opens as shown in FIG. 2. Therefore, the airbag 11 starts to expand toward a vehicle cabin.

In this case, since the windshield-side peripheral portion 11c of the airbag 11 is longer than the occupant-side peripheral portion 11b, the airbag continuously expands in such a manner that the bulk portion 11a is pushed out toward the occupant as shown by an arrow A of FIG. 3. That is, as the airbag 11, which received gas from the inflator, starts to expand outside the container 12, the occupant-side peripheral portion 11b is tensioned but the windshield-side peripheral portion 11c has still sufficient slack. Consequently, the bulk portion 11a is tensioned to move toward the occupant side so that it is about to expand toward the occupant not in a direction perpendicularly to the upper surface of the container 12.

As the airbag 11 further expands as shown in FIG. 4 and FIG. 5, the windshield-side peripheral portion 11c has no more slack and the bulk portion 11a starts to deploy like releasing the roll in the direction of arrow B of FIG. 4. Finally, the airbag 11 expands in the final deployment configuration shown by numeral 11" of FIG. 5.

As clearly shown in FIG. 4 and FIG. 5, since the airbag 11 expands toward the occupant side not in the direction perpendicularly to the panel surface of the instrument panel 30, the airbag 11 does not strongly collide with the windshield 20 during its expansion. Therefore, the airbag 11 can be smoothly and largely deployed into the vehicle cabin without being subjected to force such as friction from the windshield 20. Therefore, even when the inflator 13 employed is small in capacity of both the amount and pressure of generated gas, the airbag 11 can be sufficiently quickly deployed. Since the friction from the windshield 20 is small, the airbag 11 can be made of fabric having low strength or thin fabric.

Figure 14:
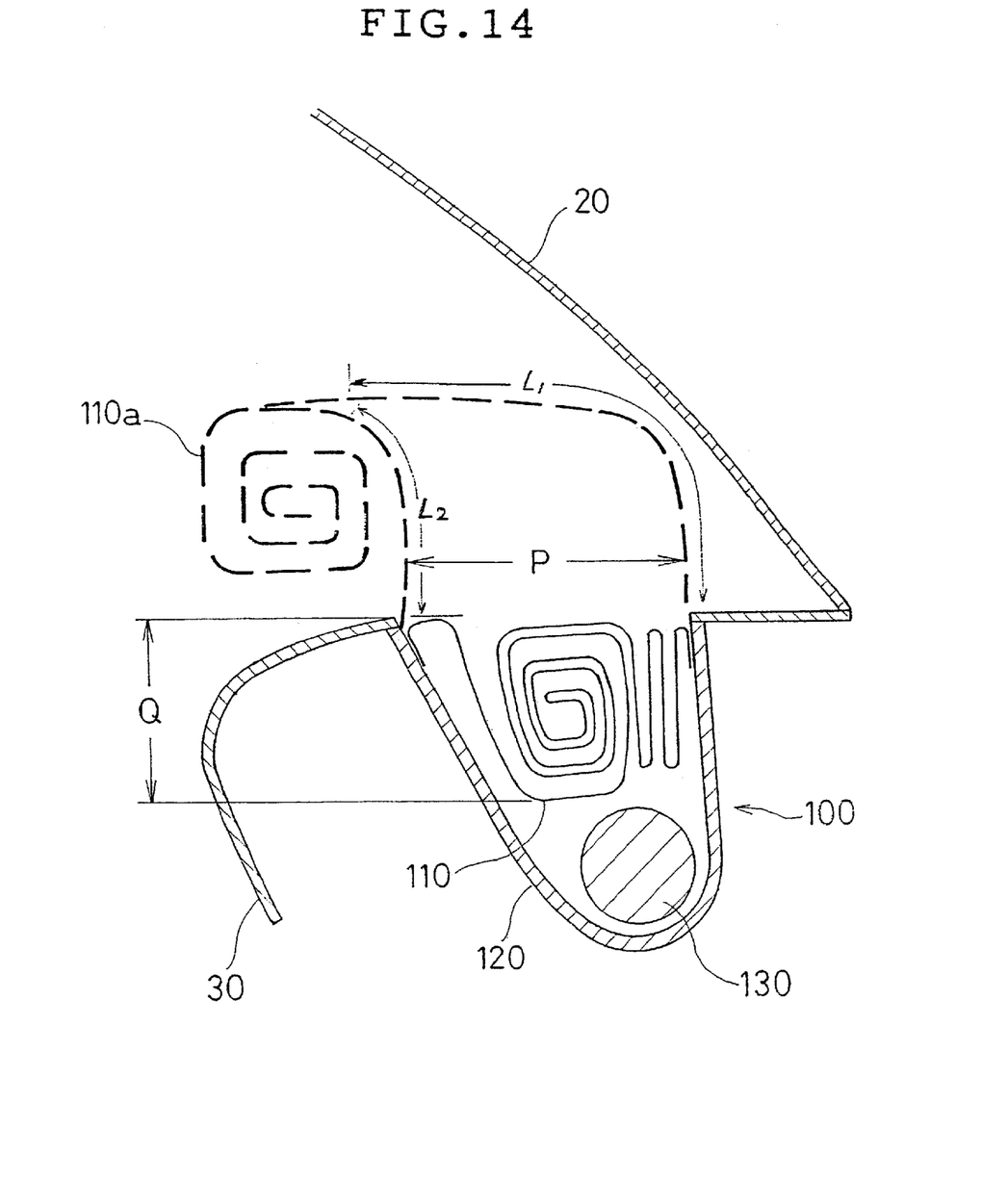
FIG. 14 is a sectional view of a passenger-side airbag device according to another embodiment.
Figure 15:
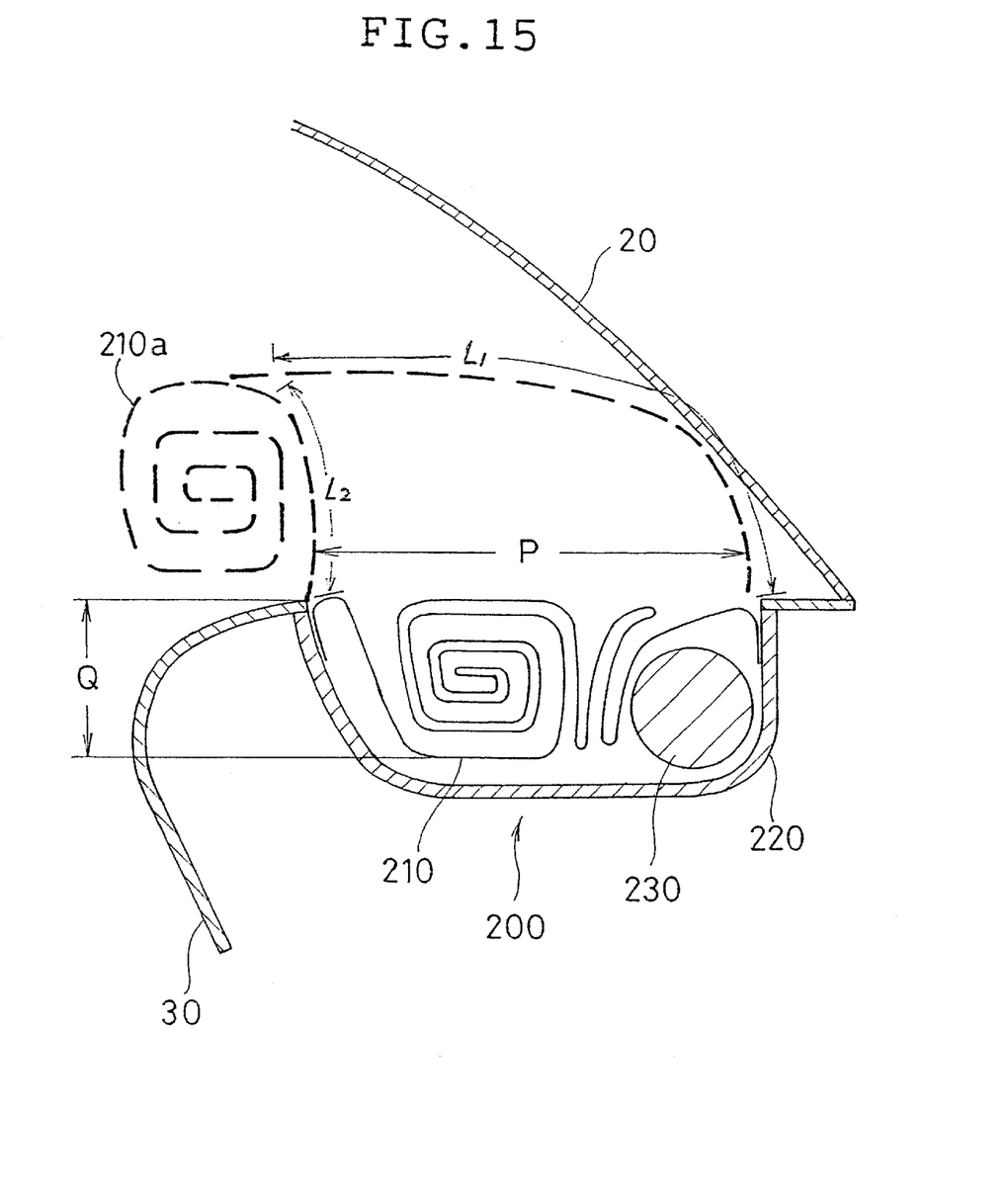
FIG. 15 is a sectional view of a passenger-side airbag device according to a further embodiment.

FIG. 14 and FIG. 15 are sectional views illustrating suitable dimensions of an airbag to be employed according to the present invention.

In FIGS. 14 and 15, a passenger-side airbag device 100, 200 installed in the instrument panel 30 is accommodated in a container 120, 220 in a state that an airbag 110, 210 is folded in the same manner as the aforementioned embodiment. As an inflator 130, 230 is actuated, the airbag 110, 210 expands in such a manner that a bulk portion 110a, 210a is pushed out toward the occupant. In FIG. 14, the inflator 130 is disposed beneath of the bulk portion 110a in the container 120. In FIG. 15, the inflator 230 is positioned on a side of the bulk portion 210a (at the windshield 20 side) in the container 220.

In each of the passenger-side airbag devices 100, 200, the ratio of the length $L_1$ of the windshield-side peripheral portion and the length $L_2$ of the occupant-side peripheral portion of the airbag 110, i.e. $L_1/L_2$, is preferably in a range between 1.5 and 4, particularly between 1.5 and 3, more particularly between 1.5 and 2.5. It is preferable that $L_2$ is substantially the same as dimension Q (the effective depth of the container) in the drawings. In addition, it is preferable that $L_1$ is substantially the same as the sum of dimension P (the width of the opening of the container along a direction of opening the lid) and Q, i.e. P+Q.

When $L_2$ is substantially 0, $L_1$ is preferably 0.5–2 times, particularly 0.5–1.5 times, more particularly 1–1.5 times, longer than the dimension P.

As described above, in the passenger-side airbag device according to the present invention installed in the upper surface of the instrument panel, the airbag can expand toward the occupant not in the direction perpendicularly to the panel surface of the instrument panel. Accordingly, the airbag during the expansion is hard to collide with the windshield so that the airbag can be rapidly deployed in the vehicle cabin. In addition, a gas generator of small capacity can be employed and the airbag can be made of thin fabric.

What is claimed is:

1. A passenger-side airbag device, comprising:
   a container to be installed in an instrument panel in front of a passenger seat,
   a gas generator connected to the container, and
   an airbag accommodated in the container to be inflated by a gas generated by the gas generator and having a gas inlet with a periphery connected to the container, said airbag, when it is folded to be accommodated in the container, including a rolled bulk portion formed by rolling the airbag, a windshield side area having a windshield side length between a windshield side of the container and the bulk portion and folded in a form of bellows disposed between the rolled bulk portion and a side portion of the container, and an occupant side area with an occupant side length between an occupant side of the container and the bulk portion, said windshield side length being longer than the occupant side length so that when the gas generator is actuated, the bulk portion is ejected from the container together with the windshield side area and the occupant side area, immediately after the airbag is ejected from the container, the windshield side area is inflated and the bulk portion is not inflated and is oriented toward the passenger seat to extend smoothly toward the passenger seat; and when the bulk portion is ejected from the container before expansion thereof the bulk portion is located above the container without substantially contacting a windshield.

2. A passenger-side airbag device according to claim 1, wherein the windshield side length is at least 1.5 times longer than the occupant side length.

3. A passenger-side airbag device according to claim 1, wherein said occupant side length has a length to allow the bulk portion to eject from the container without contacting the windshied.

* * * * *